United States Patent
Chen et al.

(10) Patent No.: US 11,210,469 B2
(45) Date of Patent: Dec. 28, 2021

(54) METHOD, APPARATUS FOR EVENT DETECTION, DEVICE AND STORAGE MEDIUM

(71) Applicant: BEIJING BAIDU NETCOM SCIENCE TECHNOLOGY CO., LTD., Beijing (CN)

(72) Inventors: Yuguang Chen, Beijing (CN); Wenhao Chen, Beijing (CN); Hui Zhou, Beijing (CN); Yuhong Zheng, Beijing (CN); Weina Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 96 days.

(21) Appl. No.: 16/374,693

(22) Filed: Apr. 3, 2019

(65) Prior Publication Data

US 2019/0370330 A1    Dec. 5, 2019

(30) Foreign Application Priority Data

Jun. 1, 2018 (CN) .......................... 201810559050.1

(51) Int. Cl.
*G06F 40/00* (2020.01)
*G06F 40/289* (2020.01)

(52) U.S. Cl.
CPC .................................. *G06F 40/289* (2020.01)

(58) Field of Classification Search
CPC .... G06F 40/237; G06F 40/169; G06F 40/247; G06F 40/30; G06F 40/00; G06F 40/10;

(Continued)

(56) References Cited

U.S. PATENT DOCUMENTS 8,352,455 B2   1/2013  Tareen
8,762,161 B2 * 6/2014  Ashkenazi ............. G06Q 10/06
                                                  705/1.1

(Continued)

FOREIGN PATENT DOCUMENTS

CA    106951511 A   7/2017
CN    102662965 A   9/2012

(Continued)

OTHER PUBLICATIONS

D. Gokcay and E. Gokcay, "Generating titles for paragraphs using statistically extracted keywords and phrases," 1995 IEEE International Conference on Systems, Man and Cybernetics. Intelligent Systems for the 21st Century, Vancouver, BC, Canada, 1995, pp. 3174-3179 vol. 4. (Year: 1995).*

(Continued)

*Primary Examiner* — Edgar X Guerra-Erazo
(74) *Attorney, Agent, or Firm* — J.C. Patents

(57) ABSTRACT

A method and an apparatus for event detection, a device, and a storage medium. An event is formed by acquiring a plurality of texts including a target keyword; extracting phrases independently describing event information from titles of the plurality of texts; and clustering the extracted phrases and gathering texts where phrases belonging to a same cluster are located to form an event. The accuracy of the event detection and the recall rate for an event can be improved through the method provided by embodiments of the present application.

13 Claims, 3 Drawing Sheets

(58) Field of Classification Search
CPC .... G06F 40/242; G06F 40/253; G06F 40/258; G06F 40/289; G06F 40/123; G06F 40/163; G06F 40/232; G06F 40/268; G06F 40/279; G06F 40/20; G06F 16/93; G06F 16/3329; G06F 2216/03; G06F 16/285; G06F 16/35
See application file for complete search history.

(56) References Cited

U.S. PATENT DOCUMENTS

| | | | | |
|---|---|---|---|---|
| 2009/0012826 | A1* | 1/2009 | Eilam | G06Q 30/02 705/7.31 |
| 2010/0088323 | A1* | 4/2010 | Ashkenazi | G06Q 10/06 707/752 |
| 2017/0132318 | A1* | 5/2017 | Xu | G06F 16/358 |

FOREIGN PATENT DOCUMENTS

| | | |
|---|---|---|
| CN | 103020251 A | 4/2013 |
| CN | 106682123 A | 5/2017 |
| CN | 107832444 A | 3/2018 |
| JP | 2010287143 A | 12/2010 |
| KR | 20070095552 A | 10/2007 |
| KR | 20150040658 A | 4/2019 |

OTHER PUBLICATIONS

A. Olariu, "Clustering to Improve Microblog Stream Summarization," 2012 14th International Symposium on Symbolic and Numeric Algorithms for Scientific Computing, Timisoara, 2012, pp. 220-226, doi: 10.1109/SYNASC.2012.10. (Year: 2012).*
The first Office Action of the priority Chinese application No. 2018105590501.
Sun, Aixin, "Query-Guided Event Detection From News and Blog Streams" IEEE Transactions on Systems, Man, and Cybernetics—Part A: System and Humans; vol. 41, No. 5; (Sep. 2011); pp. 834-839.
The extended European Search Report of corresponding European application No. 19167671, dated Jul. 3, 2019.
The first Office Action of the parallel KR application.
D1: "The Journal of the Institute of electronics information and Communication Engineers", vol. 94, No. 8, pp. 681-754, 2011(8).
"Local-areaTopic Extraction from Blog Entries", Masaaki Kikuchi.
First Office Action of the parallel Japan application.
Notice of Allowance of the parallel KR application.

* cited by examiner

METHOD, APPARATUS FOR EVENT DETECTION, DEVICE AND STORAGE MEDIUM

CROSS-REFERENCE TO RELATED APPLICATION

This application claims priority to Chinese Patent Application No. 201810559050.1, filed on Jun. 1, 2018, which is hereby incorporated by reference in its entirety.

TECHNICAL FIELD

The present disclosure relates to the technical field of a computer technology, and in particular to a method and an apparatus for event detection, a device and a storage medium.

BACKGROUND

With the development of the Internet, Internet information explodes, and everyone has to face the problem of information overload. When a user is concerned with a person or a company, the user has to face a lot of unorganized news information. If a large amount of information on the Internet can be organized at the "event" level and presented to the user, the time cost for the user to acquire information can be greatly reduced.

Currently, there are three main methods for event detection, including: a clustering method, a burst detection method, and a method of a combination of a clustering method and a burst detection method. Where, the clustering method is to cluster text bodies of texts according to a preset similarity calculation method for some text resources. The basic unit for the clustering is usually a resource such as a piece of news or a weibo that can reflect event information. Burst detection is to monitor the frequency of occurrence of keywords and identifies and extracts keywords whose frequency of occurrence has a sudden increase. The combination of the two methods is to first perform burst detection, recall the news based on the result of the burst detection, and then cluster the text bodies based on the recalled news.

However, because the keywords or search words of the burst detection are relatively short, although it can be identified that some keywords or entities have bursts, it is impossible to find out the bursts are caused by which event or events, and the event recall rate is low. And in the method of a combination of the clustering and the burst detection, the objects for the clustering are text bodies of news or weibo, so there's a problem that impure clusters and oversized clusters are easily to be formed, and the event recall rate is low.

SUMMARY

An embodiment of the present application provides a method and an apparatus for event detection, a device, and a storage medium, which are used to improve the accuracy of the event detection and the recall rate of the event.

A first aspect of an embodiment of the present application provides an event detection method, including: acquiring a plurality of texts including a target keyword; extracting phrases independently describing event information from titles of the plurality of texts; and clustering the extracted phrases and gathering texts where phrases belonging to a same cluster are located to form an event.

A second aspect of the embodiment of the present application provides an event detection apparatus, including: an acquiring module, configured to acquire a plurality of texts including a target keyword; a phrase mining module, configured to extract phrases independently describing event information from titles of the plurality of texts; and a clustering module, configured to cluster the extracted phrases and gathering texts where phrases belonging to a same cluster are located to form an event.

A third aspect of the embodiment of the present application provides a computer device, including: one or more processors; a display device, configured to display a text in an event and/or a relationship between the event and a phrase; and a storage apparatus, configured to store one or more programs that cause the one or more processors to implement the method in the first aspect when the one or more programs are executed by the one or more processors.

A fourth aspect of the embodiment of the present application provides a computer readable storage medium having a computer program stored thereon, wherein the program, when executed by a processor, implements the method in the first aspect.

Based on the above aspects, in embodiments of the present application, an event is formed by acquiring a plurality of texts including a target keyword, extracting phrases independently describing event information from the titles of the plurality of texts, and clustering the extracted phrases and gathering the texts of phrases belonging to the same cluster. In embodiments of the present application, a clustering method is further used to form an event after the plurality of texts including the target keyword are acquired, so the problem that the event recall rate is low due to the keyword being short can be avoided, which improves the event recall rate. In addition, in embodiments of the present application, when the clustering method is used to form an event, the clustering is performed based on phrases that are capable of independently describing the event information, which obviously can avoid the formation of oversized clusters in contrast to the prior art where text bodies are used as the basis for clustering. And since a phrase generally includes only one event in contrast to a text body, the purity of the cluster can be improved in embodiments of the present application, so that one cluster includes only one event, that is to say, the accuracy of event detection can be improved in embodiments of the present application.

It should be understood that the content described in the summary is not intended to limit the key or important features of embodiments of the present application, nor is it intended to limit the scope of the present application. Other features of the present application will be easily understood through the following description

DESCRIPTION OF EMBODIMENTS

Figure 1:
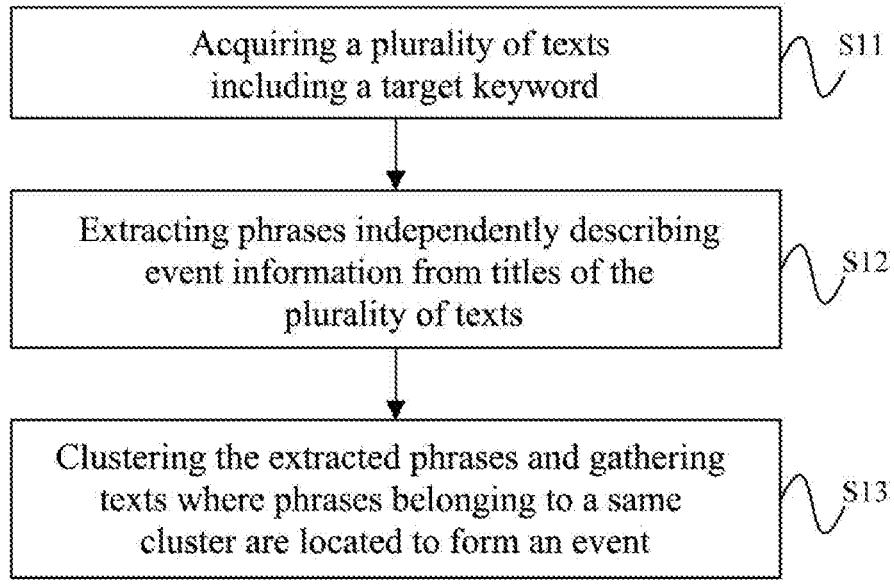
FIG. 1 is a flowchart of a method for event detection according to an embodiment of the present application.

Embodiments of the present application will be described in more detail below with reference to the drawings. Although some embodiments of the present application are shown in the drawings, it should be understood that the present application can be implemented in a variety of forms and should not be construed as being limited to the embodiments set forth herein, instead, those embodiments are provided for a more thorough and complete understanding of the present application. It should be understood that the drawings and the embodiments of the present application are intended to be illustrative only and not to limit the protection scope of the present application.

The terms "first", "second", "third", and "fourth", etc. (if present) in the specification and claims of the embodiments of the present application and the above drawings are used to distinguish similar objects, and they are not necessarily used to describe a particular order or a sequential order. It should be understood that data used in this way can be interchanged as appropriate, so that the embodiments of the present application described herein can be implemented, for example, in a sequence other than those illustrated or described herein. In addition, the terms "comprise" and "include" and any variations thereof are intended to cover a non-exclusive inclusion, for example, a process, a method, a system, a product or a device that comprises a series of steps or units is not necessarily limited to steps or units explicitly listed, but can include other steps or units that are not explicitly listed or inherent to the process, the method, the product or the device.

For ease of understanding, the terms involved in embodiments of the present application are first explained below:

1. Cluster: a cluster is a result of a clustering operation. A cluster includes a plurality of similar data. A cluster obtained based on phrase clustering in embodiments of the application includes several similar phrases.

2. Event: an event is a cluster of texts. The texts in the cluster are used to represent information of a same thing. Where a text in embodiments of the present application can refer to a news text and/or a weibo text, but not limited thereto.

3. A phrase independently describing event information: a phrase independently describing event information refers to a short sentence that can describe an event completely and unambiguously.

It can be seen from the background that the current methods for event detection based on a burst detection has the problem that an event recall rate is low, while methods for event detection based on clustering or a combination of a clustering and a burst detection has the problems that a plurality of events are included in an oversized cluster and a cluster, and the cluster is impure. For the above problems existing in the prior art, an method for event detection is provided by embodiments of the present application, which can cluster texts based on phases that can independently describe event information in the texts, on the basis of the combination of the clustering and the burst detection, so an event is acquired. In embodiments of the present application, since the event detection is performed based on a combination of the clustering and the burst detection, the problem of low event recall rate caused by only using the burst detection method can be solved. In addition, in embodiments of the present application, when the clustering method is used to form an event, the clustering is performed based on phrases that are capable of independently describing the event information, which obviously can avoid the formation of oversized clusters in contrast to the prior art where text bodies are used as the basis for clustering. And since a phrase generally includes only one event in contrast to a text body, the purity of the cluster can be improved in embodiments of the present application, so that one cluster includes only one event, that is to say, the accuracy of event detection can be improved in embodiments of the present application.

The technical solutions of embodiments of the present application will be described in detail below with reference to the drawings.

FIG. 1 is a flowchart of a method for event detection according to an embodiment of the present application, and the method can be performed by an apparatus for event detection. Referring to FIG. 1, the method includes steps S11-S13.

S11: acquiring a plurality of texts including a target keyword.

Where the target keyword can be a keyword inputted by a user through a human-computer interaction interface, or can be a keyword detected by a burst detection method, where the burst detection refers to counting search times for keywords on a target search engine within a preset time length, and when search times for a same keyword within a preset time length exceed a preset burst threshold, the keyword is determined to be the target keyword.

When the target keyword is acquired based on the burst detection method, there can only be one preset burst threshold, that is, a same burst threshold is used for burst detection of all keywords. In another possible case, there can be multiple preset burst thresholds and different burst thresholds can be used for burst detection of different keywords. In an extreme scenario, a corresponding burst threshold can be set for each keyword and the method for setting the burst threshold can be set according to experience or can be obtained by calculating based on a preset algorithm. For example, in an exemplary embodiment, the bust threshold can be obtained by calculating based on the following algorithm.

Figure 2:
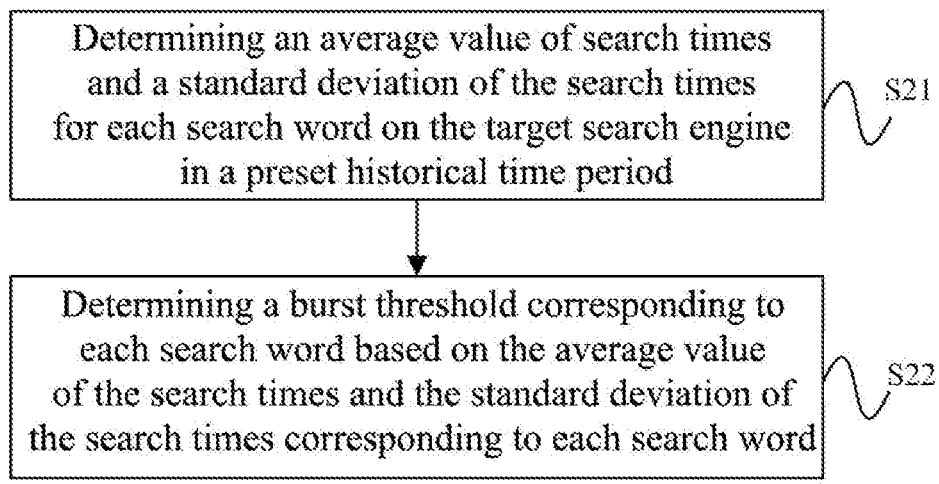
FIG. 2 is a flowchart of a method for calculating a burst threshold according to an embodiment of the present application.

FIG. 2 is a flowchart of a method for calculating a burst threshold according to an embodiment of the present application. As shown in FIG. 2, the burst threshold can be calculated by the following method:

S21: determining an average value of search times and a standard deviation of the search times for each search word on the target search engine in a preset historical time period.

S22: determining a burst threshold corresponding to each search word based on the average value of the search times and the standard deviation of the search times corresponding to each search word.

For example, assuming that search times for a keyword a is $pv_1, pv_2, \ldots, pv_{20}$, respectively, in each day during the past 20 days, the average value $pv_v$ and the standard deviation $Ep_v$ of search times for the keyword a in the past 20 days can be calculated based on $p_1, pv_2, \ldots, pv_{20}$. Further, by substituting $pv_v$ and $Ep_v$ into the following relation, the burst threshold corresponding to the keyword a can be obtained:

$$Q = g \cdot pv_v + h \cdot Ep_v$$

Where Q is the burst threshold, g and h are preset weight parameters, and g and h are constants.

Similarly, according to the above method for calculating the burst threshold, the burst threshold of other keywords within the past 20 days can also be calculated. Of course, the above is only for the purpose of clearly illustrating one possible example of the present application and is not intended to limit the present application.

Further, the target keyword referred to in this embodiment can include one or more keywords. It is required to acquire the text including all the target keywords when acquiring the text. For example, when the target keywords are "a certain celebrity" and "marriage", the acquired text is required to include both the keywords of "the certain celebrity" and "marriage".

Of course, the above is merely illustrative and is not intended to limit the present application.

Further, the text referred to in this embodiment can be acquired from a preset database or can be acquired from network media by crawling technology. This embodiment does not specifically limit the location and method for acquiring the text.

S12: extracting phrases independently describing event information from titles of the plurality of texts.

In general, a title of a text is consistent with the content to be described in the text. That is, the title of the text generally shows information of the event to be described in the text. The information is generally contained in one or more phrases independently describing the event information. By extracting the phrases from the text titles, the event that the text describes can be roughly determined, thus providing the condition for text clustering. In addition, the reason why the phrase are extracted from the text titles in this embodiment is that the text titles can reflect the core content of the texts, and there are many phases that can independently describe the event information in the text bodies, and the phrases extracted from the text bodies include a lot of information that is not related to the core event, while the text titles are relatively short and contain less useless information. Therefore, extracting the phrases based on text titles can reduce the amount of data, improve processing efficiency, and more importantly, extracting the phrases based on text titles can avoid the formation of oversized clusters, and thus ensuring the accuracy of event detection, which cannot be achieved based on text bodies.

Further, there are multiple methods provided by this embodiment for extracting phrases independently describing the event information from the text titles.

In one possible method, a universal grammatical structure can be acquired in advance according to a method of statistical analysis, and a phrase conforming to the grammatical structure is set to be capable of independently describing the information of the event. Therefore, when performing the extraction operation of the phrases, the grammatical structures of the text titles can be analyzed based on a preset grammar analysis algorithm. When there is a phrase in a parsed text title conforming to the above grammatical structure, the phrase is extracted from the text title and the relationship between the phrase and the text is recorded.

In another possible method, if the text title includes a punctuation and/or a space, phrases separated by the punctuation and/or the space can be extracted from the text title, and the phrases are used as phrases independently describing event information. For example, when the title of the article is "Bitcoin has Plunged as the New Year's Coming" and "the Reason for the Price Collapse has Finally been Exposed", the phrases that can be extracted from the title are "Bitcoin has Plunged as the New Year's Coming" and "the Reason for the Price Collapse has Finally been Exposed". Of course, the above is only an illustration and is not intended to limit the present application.

S13: clustering the extracted phrases and gathering texts where phrases belonging to a same cluster are located to form an event.

For example, assuming that the phrases extracted from the text titles include "the lead singer of xx band died", "the lead singer xx of xx band died at the age of 50" and "xx band released a new album in December", where "a lead singer of xx band died" and "a lead singer xx of xx band died at the age of 50" are clustered to belong to a same cluster. And the texts including the phrase "the lead singer of xx band died" include q, w, and e, and the texts including the phrase "the lead singer xx of xx band died at the age of 50" include p, o and i. Then the texts q, w, e, p, o and i are gathered to form an event.

The above is only an illustration and is not intended to limit the present application.

In this embodiment, an event is formed by acquiring a plurality of texts including a target keyword, extracting phrases independently describing event information from the titles of the plurality of texts, and clustering the extracted phrases and gathering the texts of phrases belonging to the same cluster. In this embodiment, a clustering method is further used to form an event after the plurality of texts including the target keyword are acquired, so the problem that the event recall rate is low due to the keyword being short can be avoided, which improves the event recall rate. In addition, in this embodiment, when the clustering method is used to form an event, the clustering is performed based on phrases that are capable of independently describing the event information, which obviously can avoid the formation of oversized clusters in contrast to the prior art where text bodies are used as the basis for clustering. And since a phrase generally includes only one event in contrast to a text body, the purity of the cluster can be improved in this embodiment, so that one cluster includes only one event, that is to say, the accuracy of event detection can be improved in this embodiment.

The above embodiment is further optimized and expanded in conjunction with the drawings.

Figure 3:
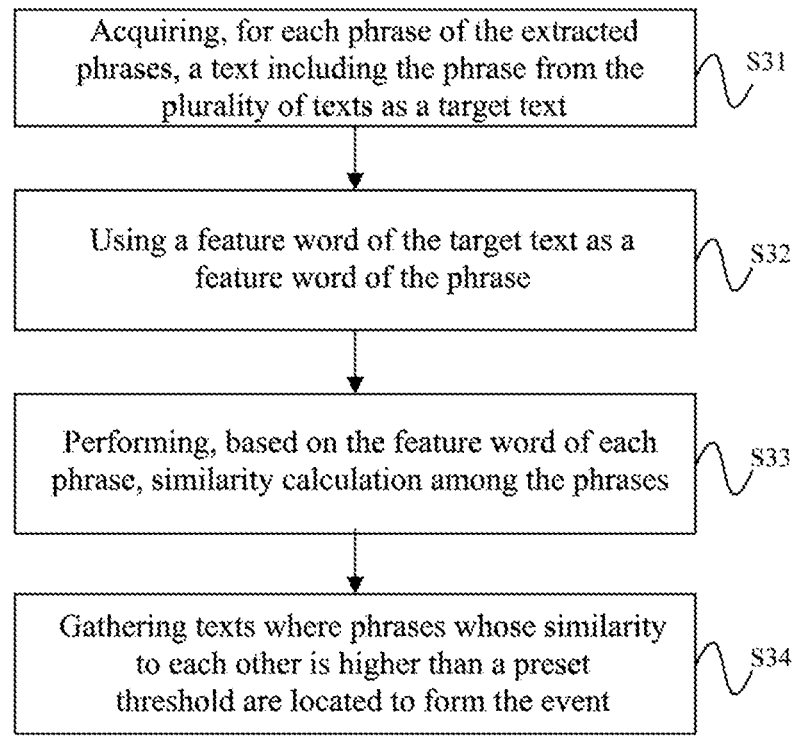
FIG. 3 is a flowchart of a method for performing step S13 according to an embodiment of the present application.

FIG. 3 is a flowchart of a method for performing step S13 according to an embodiment of the present application. As shown in FIG. 3, the method includes steps S31-S34 on the basis of the embodiment of FIG. 1.

S31: acquiring, for each phrase of the extracted phrases, a text including the phrase from the plurality of texts as a target text.

S32: using a feature word of the target text as a feature word of the phrase.

S33: performing, based on the feature word of each phrase, similarity calculation among the phrases.

S34: gathering texts where phrases whose similarity to each other is higher than a preset threshold are located to form the event.

For example, assuming that texts s, d, f, g and j are acquired in step S11 in the foregoing embodiment, the phrases extracted from the titles of the texts s, d, f, g and j include a phrase m and a phrase n. Where, among the texts s, d, f, g and j, the texts s and d include the phrase m, and the texts g and j include the phrase n. Then a feature word extracted from the texts s and d is used as the feature word of the phrase m, and a feature word extracted from the texts g and j is used as the feature word of the phrase n. Further, the similarity between the phrase m and the phrase n is calculated based on the feature word of the phrase m and the feature word of the phrase n. If the similarity between the phrase m and the phrase n is greater than the preset threshold, the texts s, d, g and j are gathered to form an event.

Where, when the feature word is extracted from the texts of the phrase, the feature word can be extracted from the text body or the abstract of the text or can be extracted from the title of the text, which is not limited in this embodiment.

Further, in this embodiment, after the event is acquired, a relationship between the event and the phrase can also be established. When the user searches for a certain event, the relationship between the event and the phrase can be displayed to the user, so that the user can select one text from the plurality of texts included in the event to read, or only the relationship between a certain text and the phrase in the event is displayed, when the user reads the text, the addresses of other texts in the event are attached in the text as recommended links.

In this embodiment, the clustering is performed based on phrases independently describing the event information, which obviously can avoid the formation of oversized clusters in contrast to the prior art where text bodies are used as the basis for clustering. And since a phrase generally includes only one event in contrast to a text body, the purity of the cluster can be improved in this embodiment, so that one cluster includes only one event, that is to say, the accuracy of event detection can be improved in this embodiment.

Figure 4:
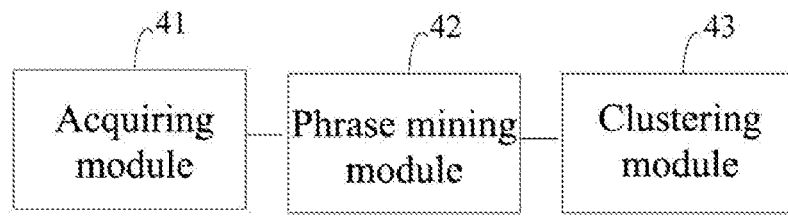
FIG. 4 is a schematic structural diagram of an apparatus for event detection according to an embodiment of the present application.

FIG. 4 is a schematic structural diagram of an apparatus for event detection according to an embodiment of the present application. As shown in FIG. 4, the apparatus 40 includes:

an acquiring module 41, configured to acquire a plurality of texts including a target keyword;

a phrase mining module 42, configured to extract phrases independently describing event information from titles of the plurality of texts;

a clustering module 43, configured to cluster the extracted phrases and gather texts where phrases belonging to a same cluster are located to form an event.

In a possible design, the acquiring module 41 includes:

a monitoring sub-module, configured to monitor the search times for a same search word on a target search engine, and use a keyword for which search times within a preset time length exceed a preset burst threshold as the target keyword.

In one possible design, the apparatus 40 further includes:

a first determining module, configured to determine an average value of search times and a standard deviation of the search times for each search word on the target search engine in a preset historical time period; and a second determining sub-module, configured to determine a burst threshold corresponding to each search word based on the average value of the search times and the standard deviation of the search times corresponding to each search word.

In a possible design, the phrase mining module includes:

the first mining sub-module, configured to extract, based on a preset grammatical structure, the phrases independently describing the event information from the titles of the plurality of texts.

In a possible design, the phrase mining module includes:

a second mining sub-module, configured to extract, from the titles of the plurality of texts, phrases separated by a punctuation and/or a space as the phrases independently describing the event information.

The apparatus for event detection according to this embodiment can be used to perform the technical solutions of the embodiment of FIG. 1, and the execution manner and the beneficial effects thereof are similar and will not be repeated here.

Figure 5:
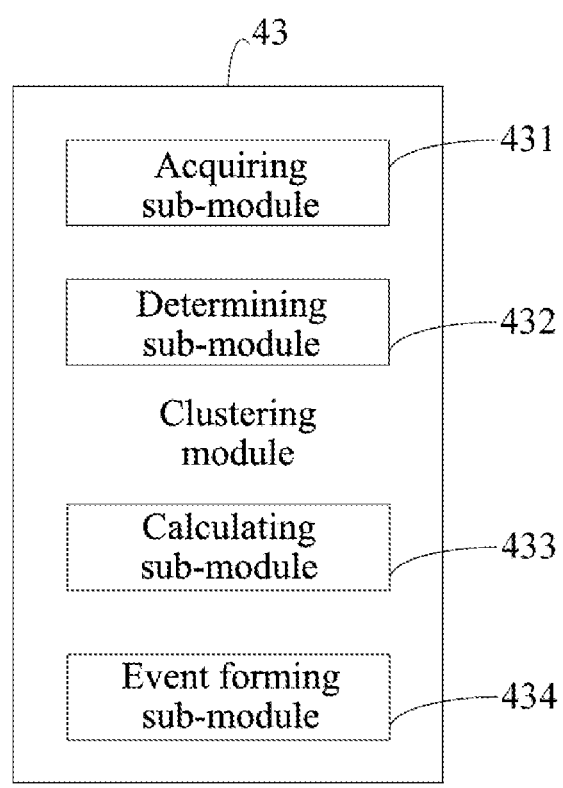
FIG. 5 is a schematic structural diagram of a clustering module 43 according to an embodiment of the present application.

FIG. 5 is a schematic structural diagram of a clustering module 43 according to an embodiment of the present application. As shown in FIG. 5, on the basis of the embodiment of FIG. 4, the clustering module 43 includes:

The acquiring sub-module 431, configured to acquire, for each phrase of the extracted phrases, a text including the phrase from the plurality of texts as a target text;

a determining sub-module 432, configured to use a feature word of the target text as a feature word of the phrase;

a calculating sub-module 433, configured to perform, based on the feature word of each phrase, similarity calculation among the phrases; and an event forming sub-module 434, configured to gather texts where phrases whose similarity to each other is higher than a preset threshold are located to form the event.

In a possible design, the determining sub-module 432 is specifically configured to:

extract a feature word from a title of the target text and use the feature word as the feature word of the phrase.

In one possible design, the apparatus 40 further includes:

a display module, configured to display a relationship between the event and the phrases.

The event detecting apparatus according to this embodiment can be used to perform the technical solutions of the embodiment of FIG. 3, and the execution manner and the beneficial effects thereof are similar and will not be repeated here.

Embodiments of the present application further provide a computer device, including: one or more processors;

a display device, configured to display a text in an event and/or a relationship between the event and a phrase; and a storage apparatus, configured to store one or more programs that cause the one or more processors to implement any one of the methods of the above embodiments when the one or more programs are executed by the one or more processors.

The embodiment of the present application further provides a computer readable storage medium, having a computer program stored thereon, wherein the program, when executed by a processor, implements the methods of the above embodiments.

The functions described above herein can be performed at least partially by one or more hardware logic components. For example, without limitation, exemplary types of hardware logic components that can be used include: field programmable gate array (FPGA), application specific integrated circuit (ASIC), application specific standard product (ASSP), system on chip (SOC), load programmable logic device (CPLD) and so on.

Program codes for implementing the methods of the disclosure can be written in any combination of one or more programming languages. Those program codes can be provided to a processor or a controller of a general purpose computer, a special purpose computer or other programmable data processing apparatuses, so that when the program codes are executed by the processor or the controller, the functions/operations specified in the flowcharts and/or block diagrams are implemented. The program codes can be executed entirely on a machine, executed partly on the machine, and executed, as separate software package, partly on the machine and partly on a remote machine or executed entirely on the remote machine or a server.

In the context of the disclosure, a machine-readable medium can be a tangible medium that can contain or store a program for being used by or used in combination with an instruction execution system, an apparatus or a device. The machine readable medium can be a machine-readable signal medium or a machine-readable storage medium. The machine-readable medium can include, but is not limited to, an electronic, a magnetic, an optical, an electromagnetic, an infrared, or a semiconductor system, apparatus, or device, or any suitable combination of the foregoing. More specific examples of machine-readable medium will include an electrical connection based on one or more wires, a portable computer disk, a hard disk, a random access memory (RAM), a read only memory (ROM), an erasable programmable read only memory (EPROM or a flash memory), optical fibers, a compact disk read only memory (CD-ROM), an optical storage device, a magnetic storage device, or any suitable combination of the foregoing.

In addition, although the operations are depicted in a particular order, it should be understood that such operations are required to be performed in the particular order illustrated or in a sequential order, or all illustrated operations are required to be performed to achieve desired results. Multitasking and parallel processing can be advantageous in certain situations. Likewise, although several specific implementation details are included in the above discussion, those details should not be understood as limiting the scope of the disclosure. Various features described in the context of separate embodiments can also be implemented in combination in a single implementation. On the contrary, various features described in the context of a single implementation can also be implemented in a plurality of implementations either individually or in any suitable sub-combination.

Although the subject matter has been described in language specific to structural features and/or methodological actions, it is understood that the subject matter defined in the appended claims is not necessarily limited to the specific features and actions described above. On the contrary, the specific features and actions described above are only exemplary forms for implementing the claims.

What is claimed is:

1. An event detection method, comprising:
    acquiring a plurality of texts including a target keyword;
    extracting phrases independently describing event information from the titles of the plurality of texts; and
    clustering the extracted phrases and gathering texts where phrases belonging to a same cluster are located to form an event;
    wherein the acquiring the plurality of texts including the target keyword comprises:
    monitoring search times for a same search word on a target search engine, and using a keyword for which search times within a preset time length exceed a preset burst threshold as the target keyword;
    wherein before the monitoring search times for a same search word on a target search engine, and using a keyword for which search times within a preset time length exceed a preset burst threshold as the target keyword, the method further comprises:
    determining an average value of search times and a standard deviation of the search times for each search word on the target search engine in a preset historical time period; and
    determining a burst threshold corresponding to each search word based on the average value of the search times and the standard deviation of the search times corresponding to each search word.

2. The method according to claim 1, wherein the extracting phrases independently describing event information from titles of the plurality of texts comprises:
    extracting, based on a preset grammatical structure, the phrases independently describing the event information from the titles of the plurality of texts.

3. The method according to claim 1, wherein the extracting phrases independently describing event information from titles of the plurality of texts comprises:
    extracting, from the titles of the plurality of texts, phrases separated by a punctuation and/or a space as the phrases independently describing the event information.

4. The method according to claim 1, wherein the clustering the extracted phrases and gathering texts where phrases belonging to a same cluster are located to form an event comprises:
    acquiring, for each phrase of the extracted phrases, a text including the phrase from the plurality of texts as a target text;
    using a feature word of the target text as a feature word of the phrase;
    performing, based on the feature word of each phrase, similarity calculation among the phrases; and
    gathering texts where phrases whose similarity to each other is higher than a preset threshold are located to form the event.

5. The method according to claim 4, wherein the using the feature word of the target text as the feature word of the phrase comprises:
    extracting a feature word from a title of the target text and using the feature word as the feature word of the phrase.

6. The method according to claim 1, wherein after the event is formed, the method further comprises:
    displaying a relationship between the event and the phrases.

7. An event detection apparatus, comprising: a processor and a computer-readable medium for storing program codes, which, when executed by the processor, cause the processor to:
    acquire a plurality of texts including a target keyword;
    extract phrases independently describing event information from titles of the plurality of texts; and
    cluster the extracted phrases and gather texts where phrases belonging to a same cluster are located to form an event;
    wherein the program codes further cause the processor to:
    monitor search times for a same search word on a target search engine, and use a keyword for which search times within a preset time length exceed a preset burst threshold as the target keyword;
    wherein the program codes further cause the processor to:
    determine an average value of search times and a standard deviation of the search times for each search word on the target search engine in a preset historical time period; and
    determine a burst threshold corresponding to each search word based on the average value of the search times and the standard deviation of the search times corresponding to each search word.

8. The apparatus according to claim 7, wherein the program codes further cause the processor to:
    extract, based on a preset grammatical structure, the phrases independently describing the event information from the titles of the plurality of texts.

9. The apparatus according to claim 7, wherein the program codes further cause the processor to:

extract, from the titles of the plurality of texts, phrases separated by a punctuation and/or a space as the phrases independently describing the event information.

10. The apparatus according to claim 7, wherein the program codes further cause the processor to:

acquire, for each phrase of the extracted phrases, a text including the phrase from the plurality of texts as a target text;

use a feature word of the target text as a feature word of the phrase;

perform, based on the feature word of each phrase, similarity calculation among the phrases; and gather texts where phrases whose similarity to each other is higher than a preset threshold are located to form the event.

11. The apparatus according to claim 10, wherein the program codes further cause the processor to:

extract a feature word from a title of the target text and use the feature word as the feature word of the phrase.

12. The apparatus according to claim 7, wherein the program codes further cause the processor to:

display a relationship between the event and the phrases.

13. A non-transitory computer readable storage medium, having a computer program stored thereon, wherein the program, when executed by a processor, implements the method according to claim 1.

* * * * *